United States Patent
Dasari et al.

(10) Patent No.: US 11,003,958 B2
(45) Date of Patent: May 11, 2021

(54) FOOD QUALITY IMAGE CLASSIFICATION

(71) Applicant: Walmart Apollo, LLC, Bentonville, AR (US)

(72) Inventors: Tarun Dasari, Bentonville, AR (US); Aditya Reddy Cheruku, Bentonville, AR (US); Kishore Sasthiri, Rogers, AR (US); Snigdha Gutha, Bentonville, AR (US); Alejandro Garcia, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 38 days.

(21) Appl. No.: 16/449,127

(22) Filed: Jun. 21, 2019

(65) Prior Publication Data
US 2019/0392262 A1  Dec. 26, 2019

Related U.S. Application Data

(60) Provisional application No. 62/690,273, filed on Jun. 26, 2018.

(51) Int. Cl.
  *G06K 9/62*  (2006.01)
  *G06T 7/90*  (2017.01)
(52) U.S. Cl.
  CPC ......... *G06K 9/6267* (2013.01); *G06K 9/6227* (2013.01); *G06K 9/6256* (2013.01); *G06T 7/90* (2017.01); *G06K 2209/17* (2013.01)
(58) Field of Classification Search
  None
  See application file for complete search history.

(56) References Cited

U.S. PATENT DOCUMENTS

| | | | |
|---|---|---|---|
| 7,212,955 B2 * | 5/2007 | Kirshenbaum | ........ G01K 1/022 340/540 |
| 9,014,434 B2 | 4/2015 | Bajema et al. | |
| 2004/0130714 A1 | 7/2004 | Gellerman et al. | |
| 2015/0300963 A1 * | 10/2015 | Haidekker | ............ G06T 7/0004 382/131 |

(Continued)

FOREIGN PATENT DOCUMENTS

| CN | 101085442 B | 12/2007 |
|---|---|---|
| CN | 101678405 A | 3/2010 |

(Continued)

OTHER PUBLICATIONS

Wen, Zhiqing, and Yang Tao. "Building a rule-based machine-vision system for defect inspection on apple sorting and packing lines." Expert Systems with applications 16.3 (1999): 307-313. (Year: 1999).*

(Continued)

*Primary Examiner* — David Perlman

(57) ABSTRACT

Embodiments of a system for food quality image classification are disclosed for classifying food items as either damaged or not damaged, and if damaged, the type of damage. Damage classification may be performed in multiple stages, for example, RGB data may be used in a first classification, and HSV data may be used in a second classification, such as whether damage is from bruising or decay. Blurring may improve determination accuracy, and an ongoing feedback and training loop may improve accuracy results over time.

16 Claims, 14 Drawing Sheets

No Damage

Damage
Bruised

Damage
Decayed

(56) References Cited

U.S. PATENT DOCUMENTS

2015/0347801 A1    12/2015    Svetal

FOREIGN PATENT DOCUMENTS

| CN | 103679144 A | 3/2014 |
|---|---|---|
| JP | 4171806 B2 | 10/2018 |
| WO | 2011158072 A1 | 12/2011 |
| WO | 2018002841 A1 | 1/2018 |

OTHER PUBLICATIONS

Phakade, S. V., et al. "Automatic fruit defect detection using hsv and rgb color space model." Int. J. Innov. Res. Comput. Sci. Technol 2.3 (2014): 67-73. (Year: 2014).*

Dubey, Shiv Ram et al., "Adapted Approach for Fruit Disease Identification Using Images," GLA University Mathura, https://arxiv.org/ftp/arxiv/papers/1405/1405.4930.pdf, captured Jun. 10, 2019, 15 pages.

Jayashree, Mahendran R. et al., "Application of Computer Vision Technique on Sorting and Grading of Fruits and Vegetables," Journal of Food Processing & Technology, https://www.omicsonline.org/application-of-computer-vision-technique-on-sorting-and-grading-of-fruits-and-vegetables-2157-7110.S1-001.pdf, captured Jun. 5, 2019, 10 pages.

Bettadpura, Vinay et al., "Leveraging Context to Support Automated Food Recognition in Restaurants," 2015 IEEE Winter Conference on Applications of Computer Vision, https://www.semanticscholar.org/paper/Leveraging-Context-to-Support-Automated-Food-in-Bettadapura-Thomaz/4aa286914f17cd8cefa0320e41800a99c142a1cd, captured Jun. 10, 2019, 7 pages.

Chauhan et al., "Quality Testing and Grading of Fruits using Non Destructive Techniques of Computer Vision: A Review", 4th International Conference on System Modeling & Advancement in Research Trends (SMART), College of Computing Sciences and Information Technology (CCSIT), Teerthanker Mahaveer University, Moradabad, 2015, 5 pages.

Copenheaver, Blaine R., "International Search Report", International Application No. PCT/US2019/038563, dated Sep. 11, 2019, 2 pages.

Copenheaver, Blaine R., "Written Opinion of the International Searching Authority", International Application No. PCT/US2019/038563, dated Sep. 11, 2019, 8 pages.

* cited by examiner

No Damage | Damage Bruised | Damage Decayed

FOOD QUALITY IMAGE CLASSIFICATION

BACKGROUND

Food classification is a time-consuming, labor-intensive task, using hundreds of quality inspectors at various grocery distribution centers (GDCs). Manually-classified images are often identified as No Damage, Damage Bruised, and Damage Decayed. The inspectors are highly skilled in performing the classification tasks, however manual classification of fruits and vegetables is time consuming, and subjectivity may lead to inconsistencies—not only among different inspectors, but also by a single inspector at different times.

SUMMARY

Embodiments of a system for food quality image classification are disclosed for classifying food items as either damaged or not damaged, and if damaged, the type of damage. Damage classification may be performed in multiple stages, for example, RGB data may be used in a first classification, and HSV data may be used in a second classification, such as whether damage is from bruising or decay. Blurring may improve determination accuracy, and an ongoing feedback and training loop may improve accuracy results over time.

Some embodiments of a system for food quality image classification, implemented on at least one processor, may comprise: a conveyor for transporting food item containers; a product code scanner for identifying food item types; an image collector for collecting images of the food items; a network for transmitting food item images and identifications to a data store; and an image classification node in communication with the data store, the image classification node comprising: a processor; and a non-transitory computer-readable medium storing instructions that are operative when executed by the processor to: receive food item images; blur the received images with a Gaussian kernel; extract features from the received images; selecting, according to food item identification, at least one classification model to define damage conditions and decay conditions; determine, using the at least one classification model and extracted features, which images are to be classified as damage and which images are to be classified as no damage; and responsive to classifying images as damage, determine, using the at least one classification model and extracted features, which images are to be classified as damage bruised and which images are to be classified as damage decayed.

Some methods for food quality image classification, implemented on at least one processor, may comprise: receiving food item images; blurring the received images; selecting at least one classification model to define damage conditions and decay conditions; determining, using the at least one classification model, which images are to be classified as damage and which images are to be classified as no damage; and responsive to classifying images as damage, determining, using the at least one classification model, which images are to be classified as damage bruised and which images are to be classified as damage decayed.

One or more exemplary computer storage devices having a first computer-executable instructions stored thereon for food quality image classification, which, on execution by a computer, cause the computer to perform operations comprising: receiving food item images; blurring the received images; selecting at least one classification model to define damage conditions and decay conditions; determining, using the at least one classification model, which images are to be classified as damage and which images are to be classified as no damage; and responsive to classifying images as damage, determining, using the at least one classification model, which images are to be classified as damage bruised and which images are to be classified as damage decayed.

Alternatively, or in addition to the other examples described herein, examples include any combination of the following: converting red, green, blue (RGB) data to hue, saturation, value (HSV) data; determining which images are to be classified as damage and which images are to be classified as no damage uses RGB data, and determining which images are to be classified as damage bruised and which images are to be classified as damage decayed uses HSV data; masking the received images wherein determining which images are to be classified as damage and which images are to be classified as no damage uses masked RGB data, and determining which images are to be classified as damage bruised and which images are to be classified as damage decayed uses masked HSV data; determining which images are to be classified as damage bruised and which images are to be classified as damage decayed uses more highly blurred image data than determining which images are to be classified as damage and which images are to be classified as no damage; determining which images are to be classified as damage and which images are to be classified as no damage uses a first classification model, and determining which images are to be classified as damage bruised and which images are to be classified as damage decayed uses a second classification model different from the first classification model; determining the accuracy of the classifications; responsive to determining the accuracy of the classifications, determining whether additional training is needed; and responsive to determining additional training is needed, training the at least one classification model; and identifying a food item type.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

A more detailed understanding may be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least some embodiments, . . . ." For brevity and clarity of presentation, this implied leading clause is not repeated ad nauseum.

Food classification is a time-consuming, labor-intensive task, using hundreds of quality inspectors at various grocery distribution centers (GDCs). Manually-classified images are often identified as No Damage, Damage Bruised, and Damage Decayed. The inspectors are highly skilled in performing the classification tasks, however manual classification of fruits and vegetables is time consuming, and subjectivity may lead to inconsistencies—not only among different inspectors, but also by a single inspector at different times. Thus, a system is desirable that saves labor and may lead to more consistent results.

Image analytics and computer vision may improve accuracy and consistency of classification, in accordance with applicable standards. Examples using strawberries are shown, although other perishable food items, such as bananas and other produce may also be used. Potential benefits include reduction in labor costs and waste caused by misclassifications. Uses include grading quality, detecting contamination, estimating freshness, automating sorting, determining ripeness and flavor, and improving accuracy. Referring to the figures, examples of the disclosure describe systems and operations for food quality image classification as either damaged or not damaged, and if damaged, the type of damage. Damage classification may be performed in multiple stages, for example, RGB data may be used in a first classification, and HSV data may be used in a second classification, such as whether damage is from bruising or decay. Blurring may improve determination accuracy, and an ongoing feedback and training loop may improve accuracy results over time.

Figure 1:
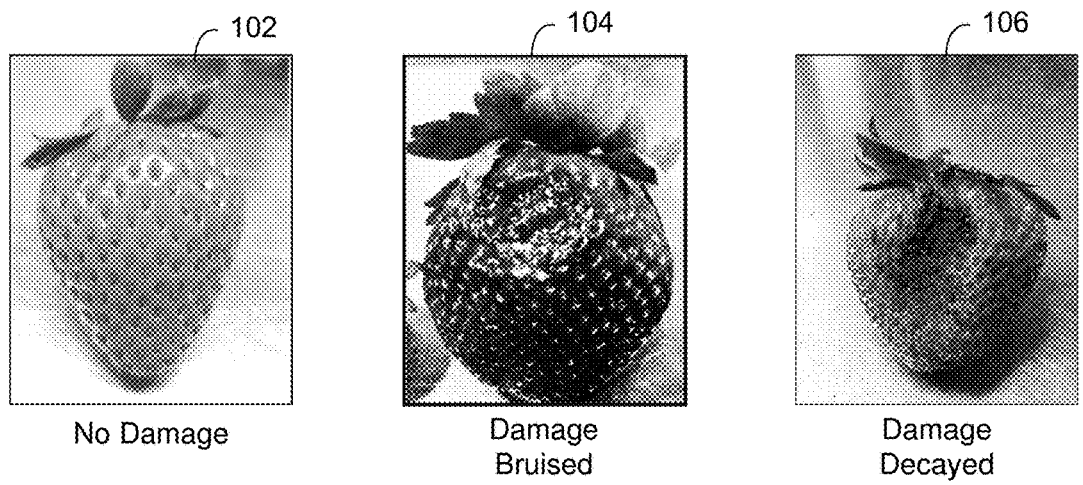
FIG. 1 illustrates examples of some different food quality classifications, using various food item images.

FIG. 1 illustrates examples of some different food quality classifications, using various food item images. Image 102 illustrates a strawberry classified as No Damage. Image 104 illustrates a strawberry classified as Damage Bruised. Image 106 illustrates a strawberry classified as Damage Decayed. It should be understood that embodiments may be employed with other items, such as other perishable food items. It should be understood that embodiments may be employed with other items, such as other perishable food items. It should also be understood that a different set of classifications may be used with some embodiments.

Figure 2:
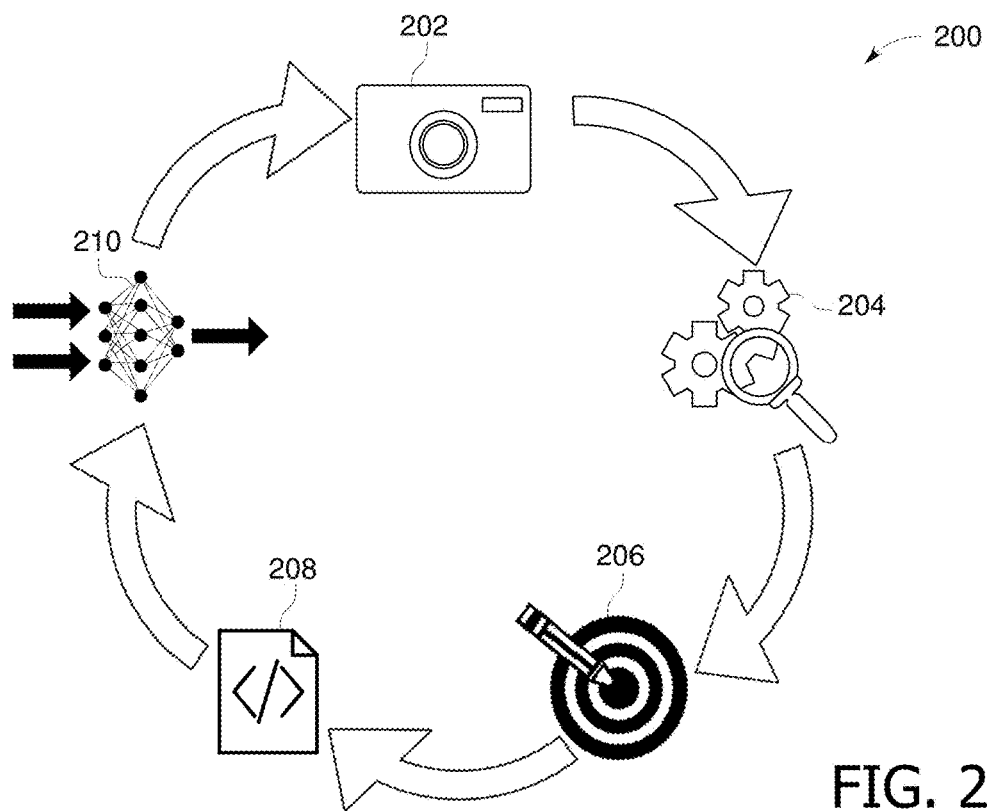
FIG. 2 is a diagram of a notional operational and training loop for food quality image classification.
Figure 2:
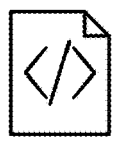

FIG. 2 is a diagram of a notional operational and training loop 200 for food quality image classification. An image collector 202, perhaps a camera, collects images of food items for analysis. The food items may be imaged singly (a single item per image), or in groups of multiple items. And a single analysis event for an item or group of items, may use a single image or multiple images, perhaps collected from different angles or different magnifications. A feature extraction and model selection module 204 analyzes features of the images, and selects a classification model that can distinguish undamaged from damaged items. In some embodiments, the undamaged versus damaged distinction is made first, followed by a distinction between types of damage, such as bruised or decayed.

A model comparison and accuracy module 206 generates data on model performance and errors, which can be used for assessing performance and identifying whether additional training or other adjustments may be needed for feature extraction and model selection module 204 and/or image collector 202. A control module 208 determines an action plan and next steps for maintaining, using, and improving models and analysis capability, for example by selecting training cases, based on the output of model comparison and accuracy module 206. A machine learning image analytics module 210 trains models, such as neural network models for use by feature extraction and model selection module 204, possibly with training data selected by control module 208. The combination of these elements, interacting as described, form notional operational and training loop 200. With ongoing training, resulting from feedback obtained through loop 200, possibly controlled by control module 208, model accuracy can improve over time.

Figure 3:
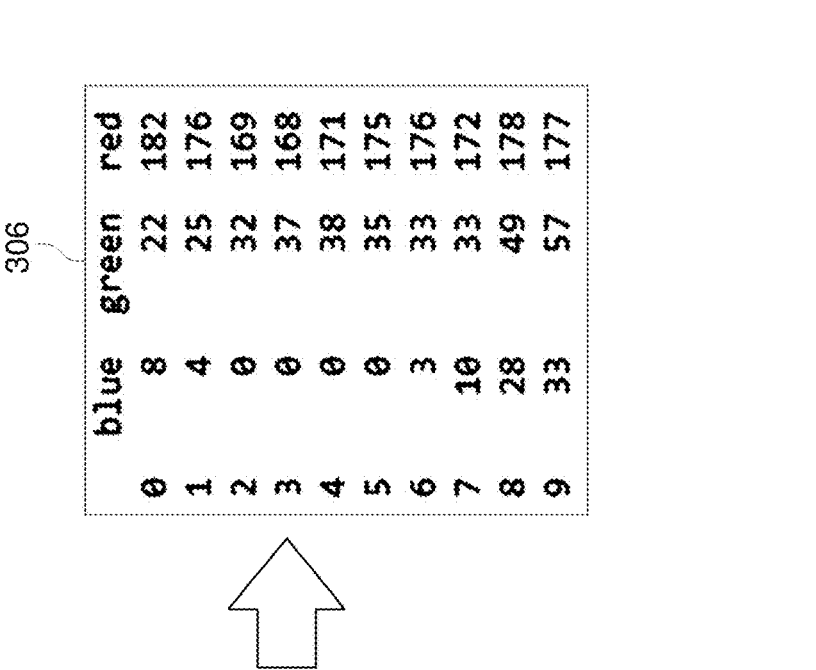
FIG. 3 illustrates some exemplary intermediate results from an image analysis operation.

FIG. 3 illustrates some exemplary intermediate results from an image analysis operation. An image 302, although illustrated in grayscale, comprises a set of three parallel two-dimensional (2D) matrices, each holding values for red, green, and blue (RGB) color components for the corresponding pixels. In a common 24-bit color image, the pixel values range from 0 to 255. The pixel color components may be represented as a set of three values. Black is [0 0 0], white is [255 255 255]. Pixels having equal red, green, and blue values between 0 and 255 are different shades of gray. When pixel color components have a higher values, such as a higher red component value than green or blue, the pixel will have a reddish tint or hue. In some conventions the order of the component values may be given as red, green, blue, although other ordering conventions may be used. For example, the output listing 304 of pixel values happens to show the reverse order, of blue, green, red.

Output listing 304 indicates the dimensions of image 302 as 480 pixels wide by 640 pixels high, and lists the pixel color components for some pixels. An output listing 306 adds a pixel index to the color components, for easier identification. For example, pixel #0 (using zero-based indexing) has [blue green red]=[8 22 182]. The higher red component value (182 versus 8 or 22) means that the pixel has a reddish hue.

Figure 4:
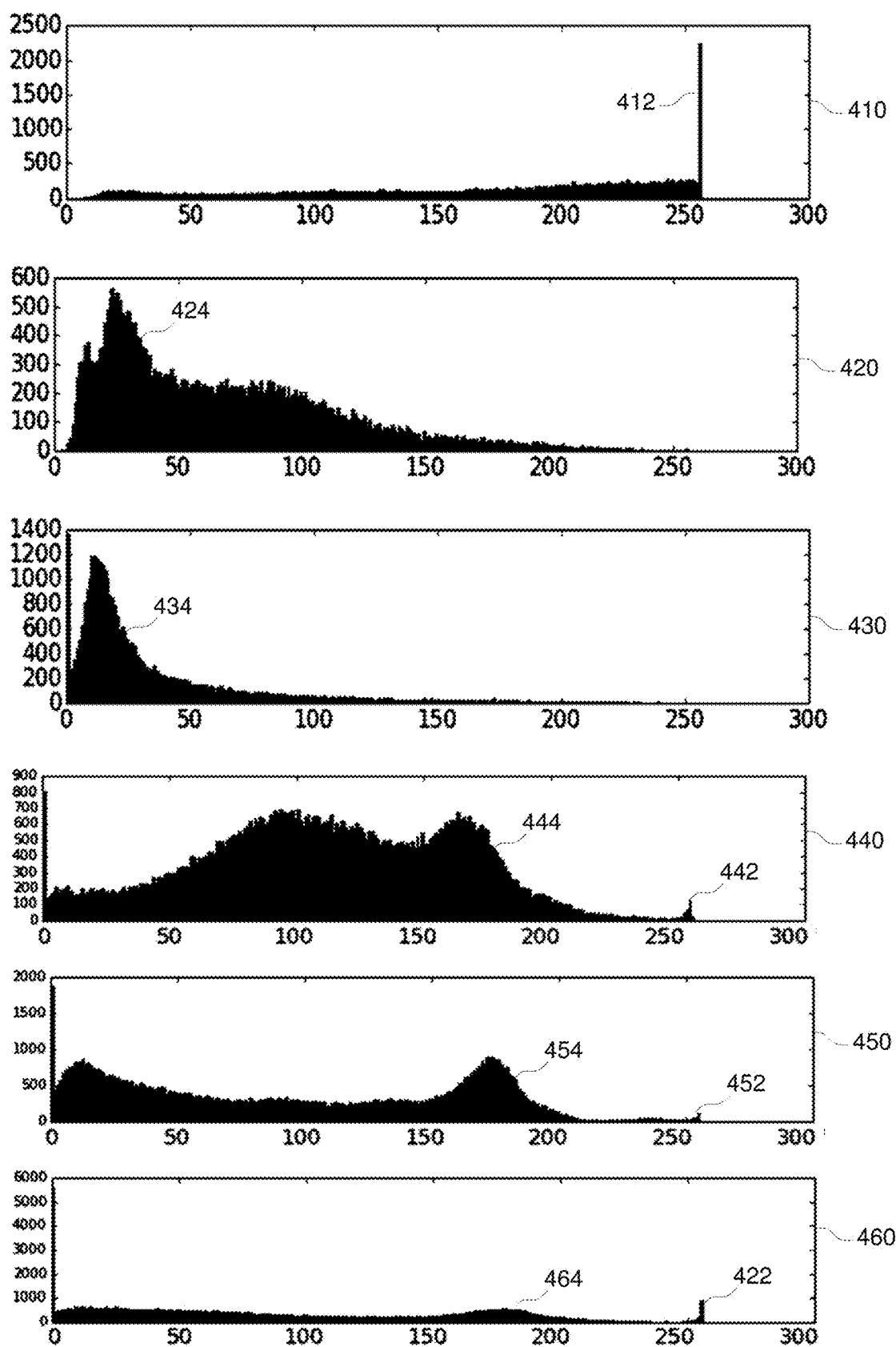
FIG. 4 illustrates some exemplary histograms for red, green and blue (RGB) pixel values in various food item images.

FIG. 4 illustrates some exemplary histograms for red, green and blue (RGB) pixel values in various food item images. Plot 410 is a histogram of red values for a representative image of undamaged strawberries. A spike 412 indicating a large number of high values (i.e., values at or near 255) indicates that the image has a relatively large amount of red. Plots 420 and 430 are a histogram of green and blue values for the same image as used to generate the histogram of plot 410. The modal groupings 424 and 434 indicate lower values of green and blue in that image. Thus, it can be inferred that the image has a dominant reddish hue across a large percentage of the image.

Plots 440, 450, and 460 are histogram of red, green, and blue values for a representative image of damaged strawberries. As can be seen by modal groupings 444, 454, and 464, there is less of a dominant reddish hue for the image of damaged strawberries than there was for the image of undamaged strawberries. There are smaller spikes of high values 442, 452, and 422. If these spikes largely correspond to the same set of pixels, then those pixels may have a whitish hue. Comparing the red histograms, 410 and 440, for the undamaged versus damaged strawberries, it can be seen that the undamaged strawberries have a higher average red intensity value. This type of pixel color component value comparison may be made for either single items, such as a single strawberry or banana (or other food item), or containers having multiple items.

Figure 5A:
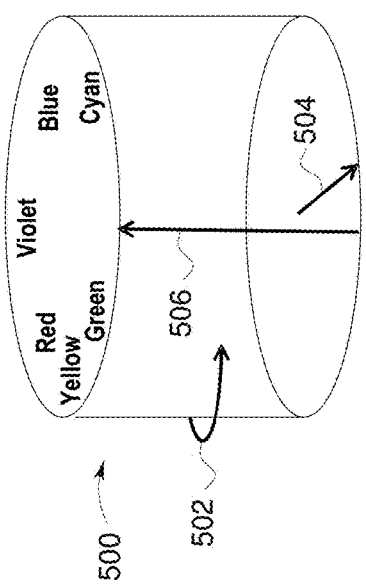
FIGS. 5A and 5B illustrate the hue, saturation, and value (HSV) color space, as an alternate to the RGB color space.
Figure 5B:
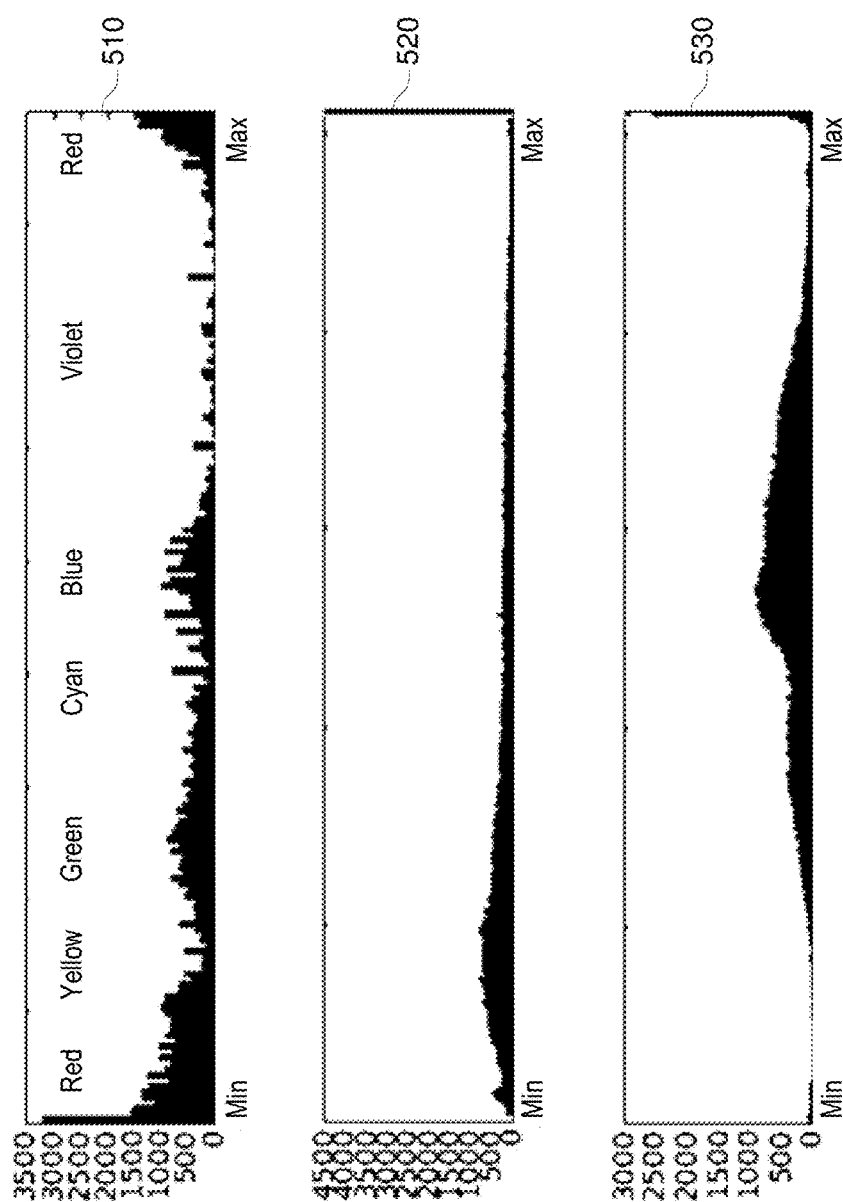

FIGS. 5A and 5B illustrate the hue, saturation, and value (HSV) color space, as an alternate to the RGB color space. There are multiple ways to represent colors in images, and RGB is only just one of several. Another is HSV, which maps more closely with how humans perceive color. Well-known mathematical transforms exist to convert pixel representations from RGB to HSV or the reverse. Hue represents the notion of a particular color, such as primary colors red, green, and blue, or secondary colors, such as cyan, magenta (violet), and yellow. Saturation represents the purity, or "deepness" of a color, such as whether the red is a deep red color (high saturation value), or is a pale red (low saturation value). Value represents how bright (high value) or dark (low value) a color is.

In FIG. 5A, HSV is represented as a cylindrical color space 500 (as opposed to RGB being a cube in Cartesian coordinate space). Hue is indicated with angular rotation vector 502, saturation with diameter vector 504, and value with height vector 506. Additionally, the relative positions of familiar colors are shown on the top of the cylinder. With this convention, white is the top center of the cylinder, and black is the bottom of the cylinder. In some illustrations, the HSV color space may be illustrated as a circular cone, with black being the sharp tip at the bottom of the cone. In FIG. 5B, plots 510, 520, and 530 are histograms for a representative image, for the hue, saturation, and value components, respectively. The relative positions of familiar colors are shown in histogram plot 510. It should be noted that the hue parameter wraps around, so that maximum values of the hue parameter are perceived by a human to be similar to minimum values of the hue parameter.

Figure 6:
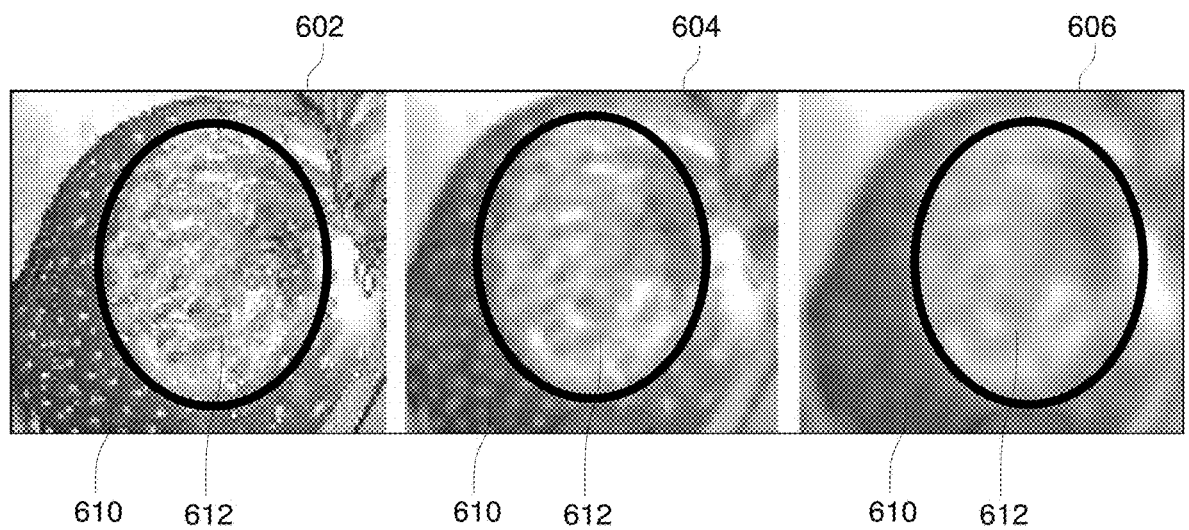
FIG. 6 illustrates results of performing an exemplary blur operation on a food quality image.

FIG. 6 illustrates results of performing an exemplary blur operation on a food quality image. Image 602 is an image of a strawberry 610 with a decay section 612, which although illustrated in grayscale is actually yellowish. The percentage of the image that is occupied by decay section 612 can be used as a parameter for determining damage. Unfortunately, in this example image 602, the decay section 612 has a similar color as the readily-visible strawberry seeds. So, to prevent false alarms caused by seeds, a blur operation is used to average out the colors among neighboring pixels. With such an operation, the pixels corresponding to relatively small seeds, surrounded by red will become more reddish and possibly nearly disappear, while pixels in decay section 612 will remain approximately the same color. Thus, whether the pixel changes color can give an indication as to whether it corresponds to either a seed or a decay section. This assists in increasing the reliability of distinguishing between seeds and decay sections in an image, when using a yellowish hue as a discriminant. In some embodiments, a blurring operation may be accomplished by convolving an image with a Gaussian kernel. Image 604 shows the blur results when using a Gaussian kernel with a radius of 5, and image 606 shows the blur results when using a Gaussian kernel with a radius of 10.

Figure 7:
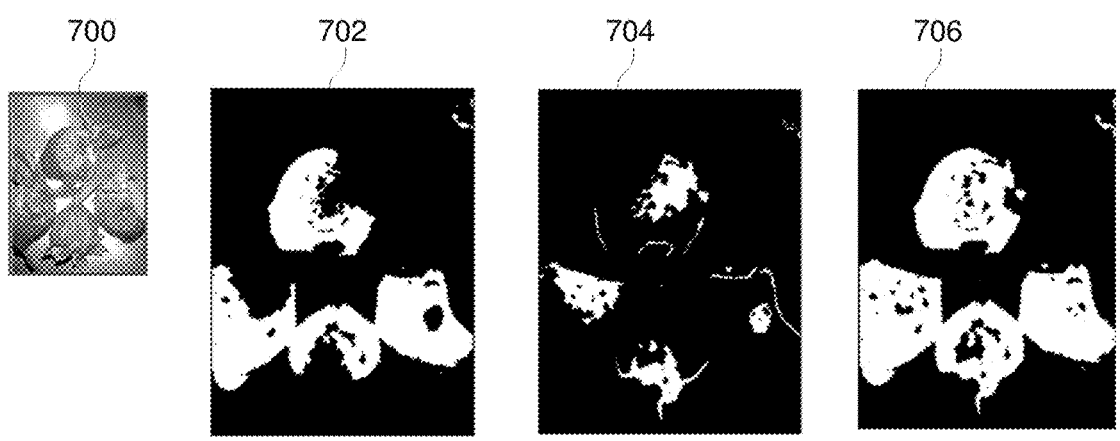
FIG. 7 illustrates exemplary segmentation masks for a food quality image.

FIG. 7 illustrates exemplary segmentation masks 702, 704, and 706, for a food quality image. In an exemplary operation, a collected image 700 is converted from RGB to HSV, and blurred, possibly by convolving with a Gaussian kernel. Then, the amount of red in the image pixels is determined, and pixels having a sufficiently red hue, as possibly determined by a threshold comparison, are determined, and used to generate red mask 702. In one example, the threshold values in HSV space may be [0 7 150] through [15 250 255] to capture the indicated reddish pixels. A decay color region in HSV space, may be defined by exemplary threshold region [20 70 150] through [30 150 255], to capture yellowish pixels. A hue of 20 to 30 may be considered to be yellowish, in some expressions of the HSV color space.

The decay region is determined and used to generate decay mask 704. The combination of red mask 702 and decay mask 704 is combined mask 706. Alternatively, combined mask 706 may be generated using the outer threshold limits, such as [0 7 150] through [30 150 255]. The pixels within the white areas of combined mask 706 may be used for determining average red values and percentage yellow areas for use in distinguishing damage and decay. Using only pixels passing through mask 706, rather than the entirety of image 700, may reduce the likelihood that unrelated objects within image 700 (such as the leaves and the container holding the strawberries) might be improperly used in the determinations of whether items are damaged.

Figure 8:
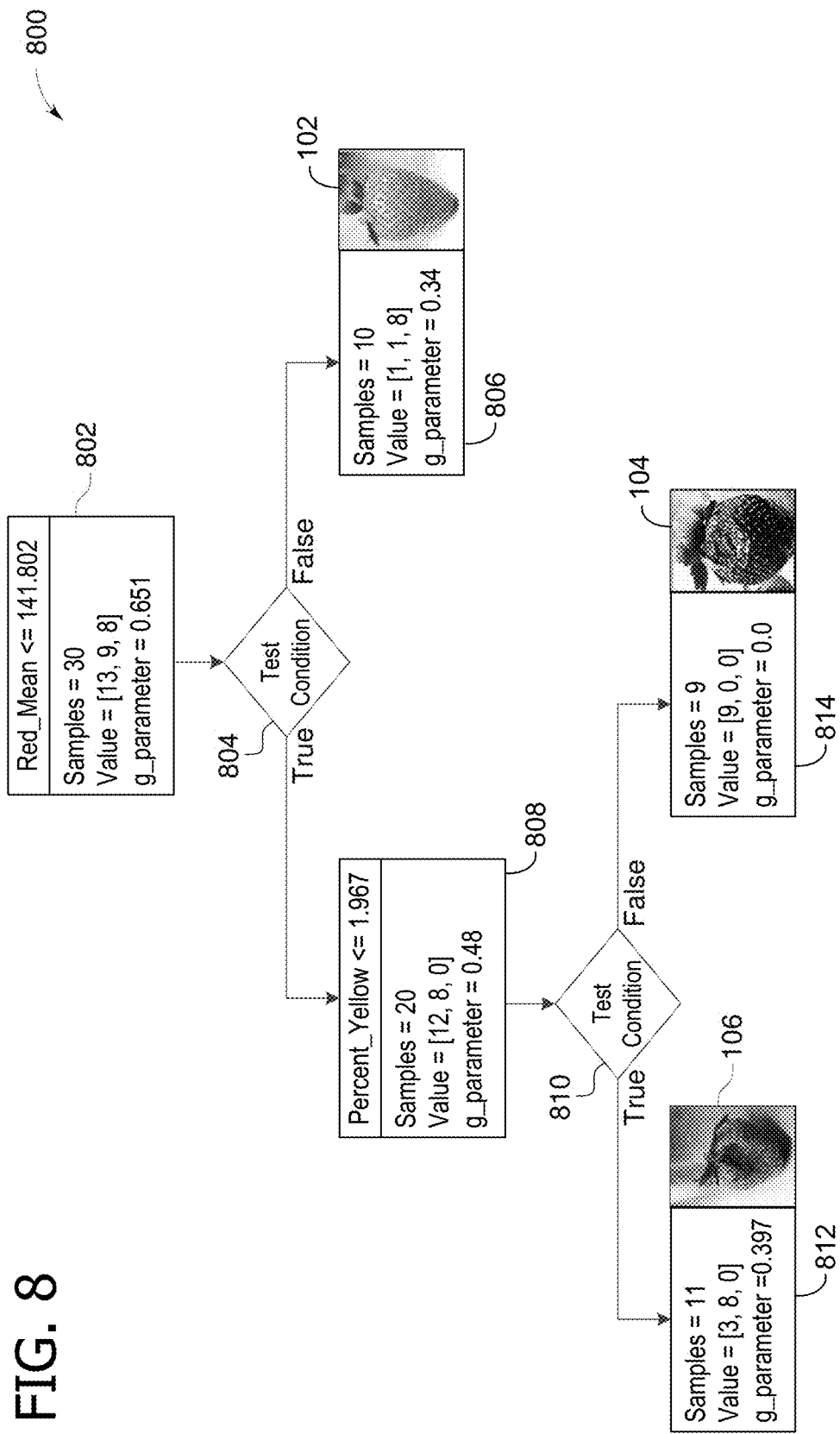
FIG. 8 illustrates exemplary results of a food quality classification operation for the images of FIG. 1.

FIG. 8 illustrates exemplary results of a food quality classification operation for the images of FIG. 1. The results are presented as a decision tree 800, showing two tiers of determinations. Determinations may use pixel color components in RGB space, HSV space, or both. In box 802, the mean value of the red component of some images (possibly using a mask, such as mask 706 of FIG. 7) is determined and compared with a threshold. In decision operation 804, a determination is made whether the threshold is true or false. As illustrated, the Red_Mean is tested against being less than or equal to approximately 142. This indicates use of the RGB color space, with the red value used. If this condition is false, then Red_Mean is above the threshold, indicating a more reddish color. The results for images in this category, such as exemplary image 102 are shown in box 806. As indicated, of the 30 samples (as specified in box 802), 10 of the samples are in this category. This is the undamaged category.

The other category is damaged items, which are collected in box 808. There are 20 of the 30 images fitting into this category, in this example. These images are then subjected to another test, as to what percentage of the image is within the yellow threshold region. This test is conducted with the HSV color space values, although another color space may instead be used, such as luminosity, hue, and saturation (LHS or HSL), in some embodiments. In decision operation 804, a determination is made whether number pixels meeting the specified threshold is true (satisfied) or false (not satisfied). If the condition is true, this is the damage decayed category, illustrated with exemplary image 106, with results shown in box 812. If the condition is false, this is the damage bruised category, illustrated with exemplary image 104, with results shown in box 814. Thus, as indicated, of the 30 images, 10 were classified as undamaged, 9 were classified as damaged bruised, and 11 were classified as damage decayed.

Decision tree 800 leverages some known conditions, such as that mean red values tend to be higher for undamaged strawberries, and a high percentage of yellowish pixels may indicate decay. More consistent color may provide more consistent results, so the images processed in this manner may be blurred and masked as described above. In some exemplary results, a set of approximately 150 images were used. 80% were used to train a classification model, and 20% were used as a test. Decision tree 800 achieved accuracy results (as compared with a human determinations) of 95% for undamaged versus damaged classification, and 83% when including the specific damage bruised and damage decayed classifications.

Figure 9:
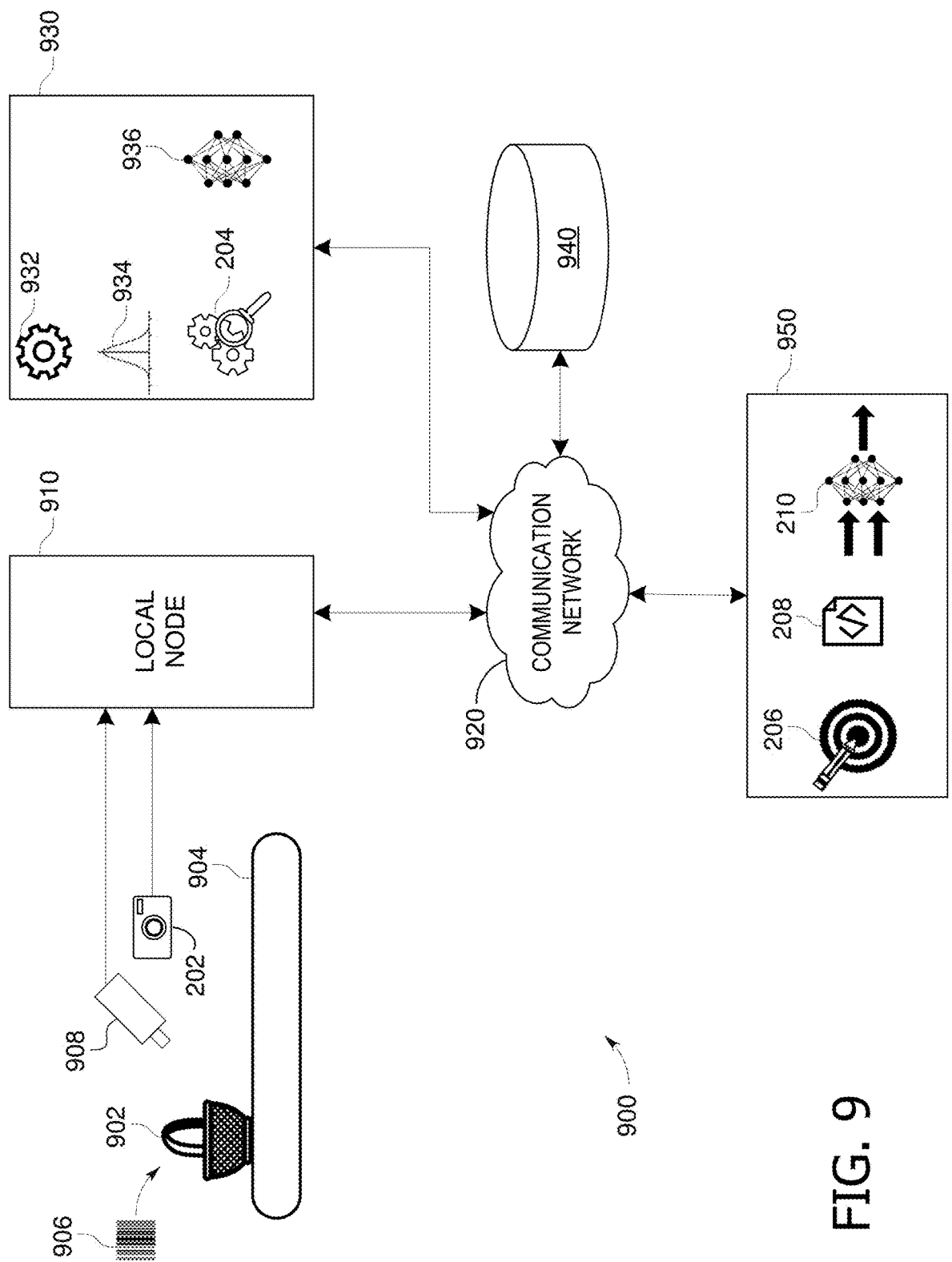
FIG. 9 shows an exemplary embodiment of a food quality image classification system.

FIG. 9 shows an exemplary embodiment of a food quality image classification system 900. System 900 includes a container 902 for food items, transported by a conveyor 904. Food items within container 902 (or container 902 itself) have an identifier 906, such as perhaps a UPC barcode, which is read by product code scanner 908 to identify the food item type. Image collector 202 collects one or more images of the food items as they pass by. In alternative embodiments, food items may remain stationary, and the scanning/imaging components may move. The data is fed to a local node 910, which is in communication with a communication network 920.

As illustrated, there are other nodes also in communication with communication network 920, including an image classification node 930, a data store 940, and an administrative node 950. Each of nodes 910, 930, 940, and 950 may comprise an operating environment 1100, as described in reference to FIG. 11. Network 920 is operative to transmit food item images and identifications to data store 940 and image classification node 930. Image classification node 930 may use network 920 to store results in data store 940, and also to forward them to administrative node 950 to facilitate accuracy analysis and further training. It should be understood, however, that the functionality of the various nodes shown may be allocated differently than as illustrated, such as for example, all functionality may be concentrated within a single device, such as computer 1110 of FIG. 11. Or, alternatively, a larger number of nodes may be used, further dividing the functionality.

Image classification node 930 includes feature extraction and model selection module 204, a pixel operations module 932, a blur module 934, and a set of classification models 936. In operation, image classification node 930 receives food item images and food item type identifications; and selects, according to the food item identification, at least one classification model to define damage conditions and decay conditions. In some embodiments, a single model may define both types of criteria, such as damaged/undamaged and bruised/decayed. In some embodiments, different models may be used for the damaged/undamaged classification and braised decayed classification.

Pixel operations module 932 extracts features from the received images, such as pixel RGB color components and mean values, and can create masks (see FIG. 7) for pixel operations. In some embodiments, only pixels passing through a mask are used for the classification determinations. Pixel operations module 932 also converts RGB data to HSV data, or some other color space (such as LHS/HSL). In some embodiments, determining which images are to be classified as damage and which images are to be classified as no damage (undamaged) uses RGB data, whereas determining which images are to be classified as damage bruised and which images are to be classified as damage decayed uses HSV data. Blur module 934 blurs the received images, possibly using a Gaussian kernel. Classification models 936 comprise data useable for classification, such perhaps thresholds for red values and yellow values. For example a region of RGB space defined by a threshold (or HSV space defined by threshold boundaries), may be used for comparison with mean red color component values, and a region of HSV color space defined by threshold boundaries may be used for a determination of yellow pixels.

The classification operations are performed in two stages, first the damage or no damage classification (damaged/undamaged), and then the images classified as damaged are then further classified by the type of damage (bruised/decayed). In some embodiments, for example the mean red pixel value is extracted from RGB data, and compared with a threshold. If the mean red value exceeds the threshold, then the image is classified as no damage. If the mean red value falls below the threshold, then the image is blurred and converted to HSV. The hue is then compared with thresholds that define the yellow region in HSV space, and the percent of the pixels falling into the yellow definition is compared with a threshold to determine whether the damage is bruising (low yellow pixel count) or decay (high yellow pixel count).

After classification the food items are disposed of, accordingly. For example, responsive to the classifications, food items are stored for later sale, diverted to a bruised food item handling process, or moved into a decayed food item storage area to avoid spreading decay to other food items. Additionally, the classification results are analyzed for accuracy by model comparison and accuracy module 206 at administrative node 950. Control module 208 handles an action plan for managing, using, and improving models and analysis capability, for example by determining whether additional training is needed and selecting training cases, based on the output of model comparison and accuracy module 206. Machine learning image analytics module 210 then trains models in set of classification models 936, for example, by adjusting threshold values, other discriminants, and possibly adjusting the blur kernel.

Figure 10:
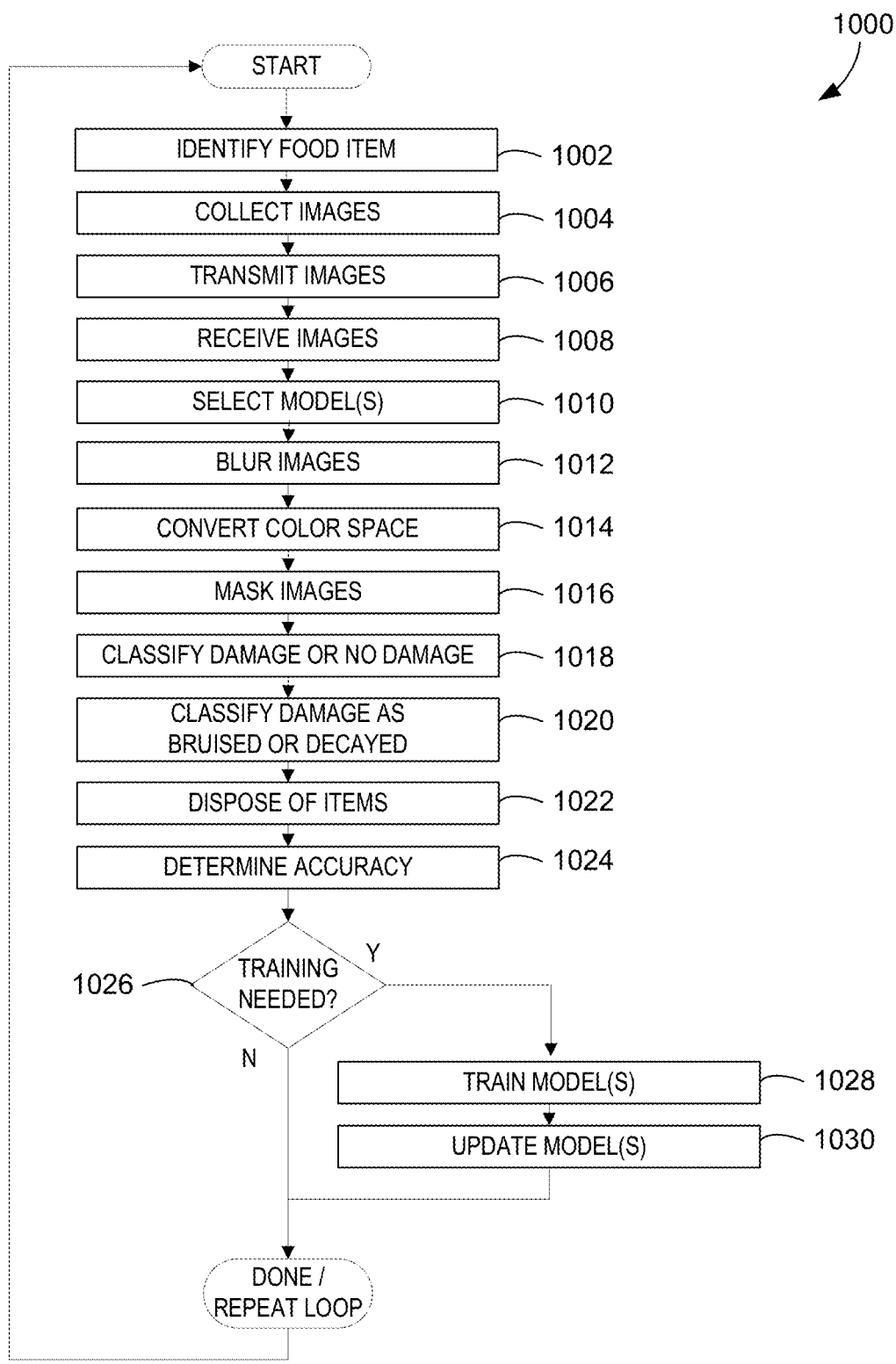
FIG. 10 is a diagram of an exemplary process flow for food quality image classification.

FIG. 10 is a diagram of an exemplary process flow 1000 for food quality image classification, which may be implemented on a processor, using instructions stored in a non-transitory computer-readable media. A food item type is identified in operation 1002, such as by scanning a UPC barcode as a container moves past a scanner on a conveyor. Images are collected in operation 1004, transmitted along with food type identification for storage and classification in operation 1006, and received in operation 1008. In operation 1010, at least one classification model is selected for use in defining damage conditions and decay conditions, such as by specifying color value thresholds, HSV region boundaries, decay region size threshold, and blur kernel parameters.

The classification model, or models, will be selected according to food item identification. For examples, some models may be for strawberries, other models may be for bananas, and other models may be for lettuce or pears, or onions, or other produce items. A color value threshold may be a minimum mean red value threshold, for defining damage; HSV region boundaries may specify thresholds for defining yellow, a decay region size threshold may define a percent yellow number for use in classifying damage as decay, and blur kernel parameters including profile and diameter may be specified. Images are blurred in operation 1012, possibly with a Gaussian kernel. RGB data is converted to HSV data, or some other color space in operation 1014, and images are masked in operation 1016.

Classification operation 1018 includes determining which images are to be classified as damage and which images are to be classified as no damage. Operation 1018 may compare mean or media red color component values (RGB data) with a threshold, or may use a red region defined in HSV space, using hue, saturation, and value. Sufficiently reddish pixel data indicates no damage or undamaged, and insufficiently reddish pixels indicate some form of damage. The pixels used in the mean or median calculation may be masked, to omit pixels for leaves and containers. Additionally, the damage or no damage classification may use clear or blurred images.

Responsive to classifying images as damaged, classification operation 1020 includes determining which images are to be classified as damage bruised and which images are to be classified as damage decayed. Operation 1020 may compare pixels with a yellow color defined as a region in HSV space. Sufficiently yellow pixel data may indicate decay. A region of decay exceeding some percentage of the food item image may indicate an unacceptable level of decay, resulting in the image classification of damage decayed. Otherwise, the damage may be classified as damage bruised. The pixels used in the percentage calculation may be masked, to omit pixels for leaves and containers. Additionally, the damage decayed classification may use more highly blurred image data than determining which images are to be classified as damage and which images are to be classified as no damage. Operations 1018 and 1020 may use the same classification model or different classification models.

After classification the food items are disposed of, accordingly, in operation 1022. For example, responsive to the classifications, food items are stored for later sale, diverted to a bruised food item handling process, or moved into a decayed food item storage area to avoid spreading decay to other food items. The accuracy of the image classifications is determined in operation 1024, perhaps by a human performing a quality analysis (QA) on the results. For example, a human may spot-check the results for some percentage of the food items. Alternatively, an alternate model may be used, perhaps one that had been trained with a different training data set, and the results from using the different models may be compared. Responsive to determining the accuracy of the classifications, decision operation 1026 determines whether additional training is needed. Responsive to determining that additional training is needed, operation 1028 trains the classification model or models, and operation 1030 updates the additionally-trained models in set of classification models 936 (of FIG. 9).

Exemplary Operating Environment

Figure 11:
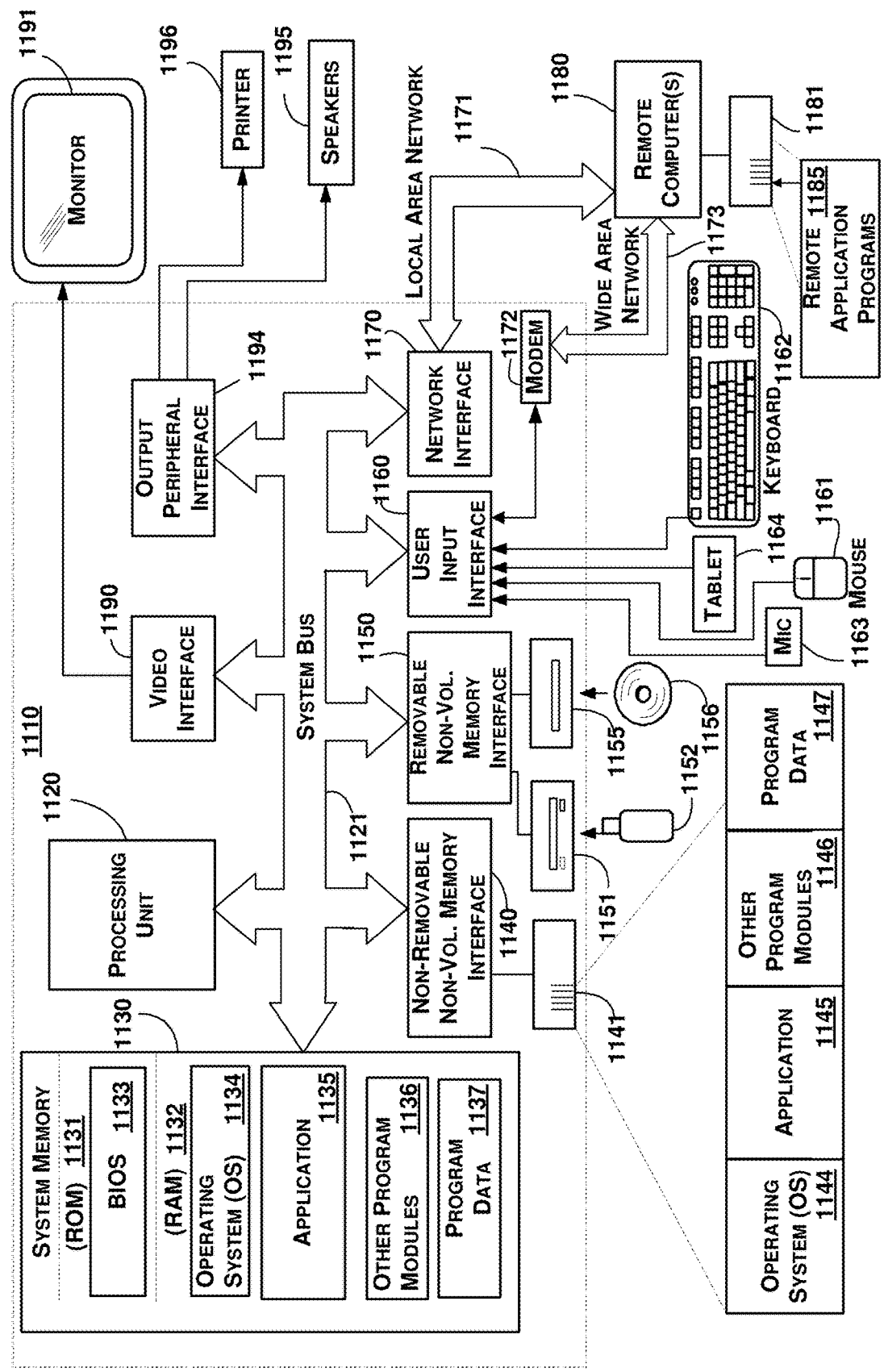
FIG. 11 is an exemplary block diagram illustrating an operating environment for a computing device that may operate or control some embodiments disclosed herein, or related functionality.

FIG. 11 is an exemplary block diagram illustrating an operating environment 1100 for a computing device that may operate or control some embodiments or functionality disclosed herein, or related functionality. The computing system environment 1100 is only one example of a suitable computing environment and is not intended to suggest any limitation as to the scope of use or functionality of the disclosure. Neither should the computing environment 1100 be interpreted as having any dependency or requirement relating to any one or combination of components illustrated in the exemplary operating environment 1100. The disclosure is operational with numerous other general purpose or special purpose computing system environments or configurations. Examples of well-known computing systems, environments, and/or configurations that may be suitable for use with the disclosure include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and so forth, which perform particular tasks or implement particular abstract data types. The disclosure may also be practiced in distributed computing environments where tasks are performed by remote processing devices that are linked through a communications network. In a distributed computing environment, program modules may be located in local and/or remote computer storage media including memory storage devices and/or computer storage devices. As used herein, computer storage devices refer to hardware devices.

With reference to FIG. 11, an exemplary system for implementing various aspects of the disclosure may include a general purpose computing device in the form of a computer 1110. Components of the computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1110 typically includes a variety of computer-readable media. Computer-readable media may be any available media that may be accessed by the computer 1110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or the like. Memory 1131 and 1132 are examples of non-transitory computer-readable storage media. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by the computer 1110. Computer storage media does not, however, include propagated signals. Rather, computer storage media excludes propagated signals. Any such computer storage media may be part of computer 1110.

Communication media typically embodies computer-readable instructions, data structures, program modules or the like in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs, such as an application 1135 that may perform operations described herein, other program modules 1136 and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a universal serial bus (USB) port 1151 that provides for reads from or writes to a removable, nonvolatile memory 1152, and an optical disk drive 1155 that reads from or writes to a removable, nonvolatile optical disk 1156 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and USB port 1151 and optical disk drive 1155 are typically connected to the system bus 1121 by a removable memory interface, such as interface 1150.

The drives and their associated computer storage media, described above and illustrated in FIG. 11, provide storage of computer-readable instructions, data structures, program modules and other data for the computer 1110. In FIG. 11, for example, hard disk drive 1141 is illustrated as storing operating system 1144, an application 1145 that may perform operations described herein, other program modules 1146 and program data 1147. Note that these components may either be the same as or different from operating system 1134, optimization environment 1135, other program modules 1136, and program data 1137. Operating system 1144, optimization environment 1145, other program modules 1146, and program data 1147 are given different numbers herein to illustrate that, at a minimum, they are different copies. A user may enter commands and information into the computer 1110 through input devices such as a tablet, or electronic digitizer, 1164, a microphone 1163, a keyboard 1162 and pointing device 1161, commonly referred to as mouse, trackball or touch pad. Other input devices not shown in FIG. 11 may include a joystick, game pad, satellite dish, scanner, or the like. These and other input devices are often connected to the processing unit 1120 through a user input interface 1160 that is coupled to the system bus, but may be connected by other interface and bus structures, such as a parallel port, game port or a universal serial bus (USB). A monitor 1191 or other type of display device is also connected to the system bus 1121 via an interface, such as a video interface 1190. The monitor 1191 may also be integrated with a touch-screen panel or the like. Note that the monitor and/or touch screen panel may be physically coupled to a housing in which the computing device 1110 is incorporated, such as in a tablet-type personal computer. In addition, computers such as the computing device 1110 may also include other peripheral output devices such as speakers 1195 and printer 1196, which may be connected through an output peripheral interface 1194 or the like.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated in FIG. 11. The logical connections depicted in FIG. 11 include one or more local area networks (LAN) 1171 and one or more wide area networks (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160 or other appropriate mechanism. A wireless networking component such as comprising an interface and antenna may be coupled through a suitable device such as an access point or peer computer to a WAN or LAN. In a networked environment, program modules depicted relative to the computer 1110, or portions thereof, may be stored in the remote memory storage device. By way of example, and not limitation, FIG. 11 illustrates remote application programs 1185 as residing on memory device 1181. It may be appreciated that the network connections shown are exemplary and other means of establishing a communications link between the computers may be used.

Figure 12:
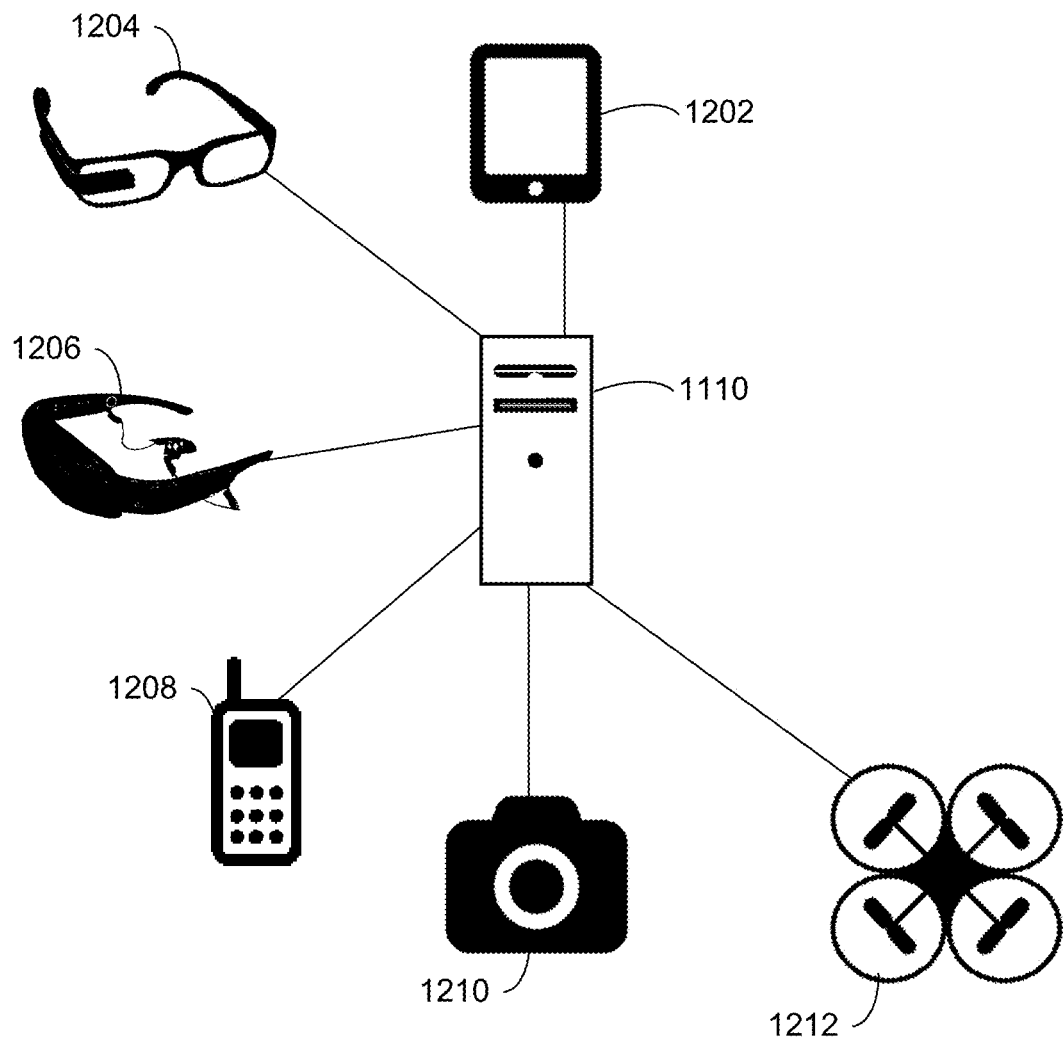
FIG. 12 is an exemplary diagram illustrating various input and output options that may function with some of embodiments disclosed herein.
Figure 13:
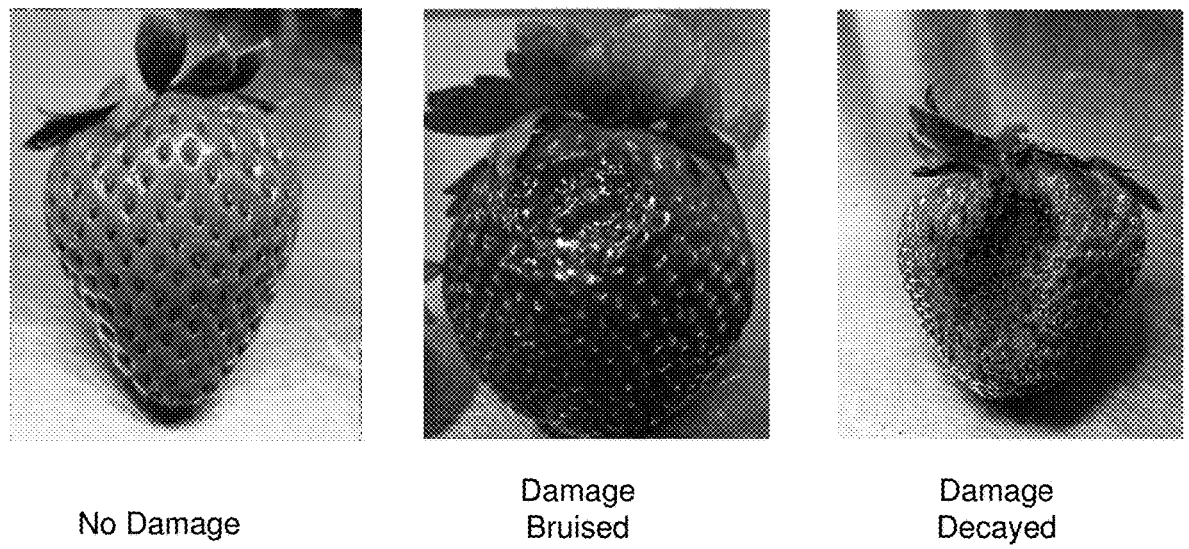
FIG. 13 illustrates examples of some different food quality classifications, using various food item images.
Figure 14:
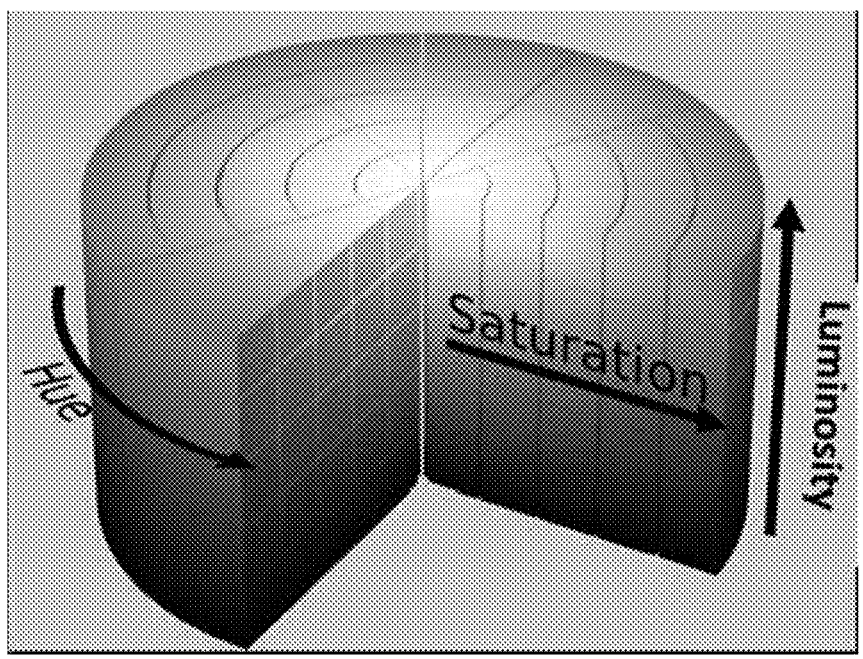
FIG. 14 illustrates the HSV color space, as an alternate to the RGB color space.
Figure 15:
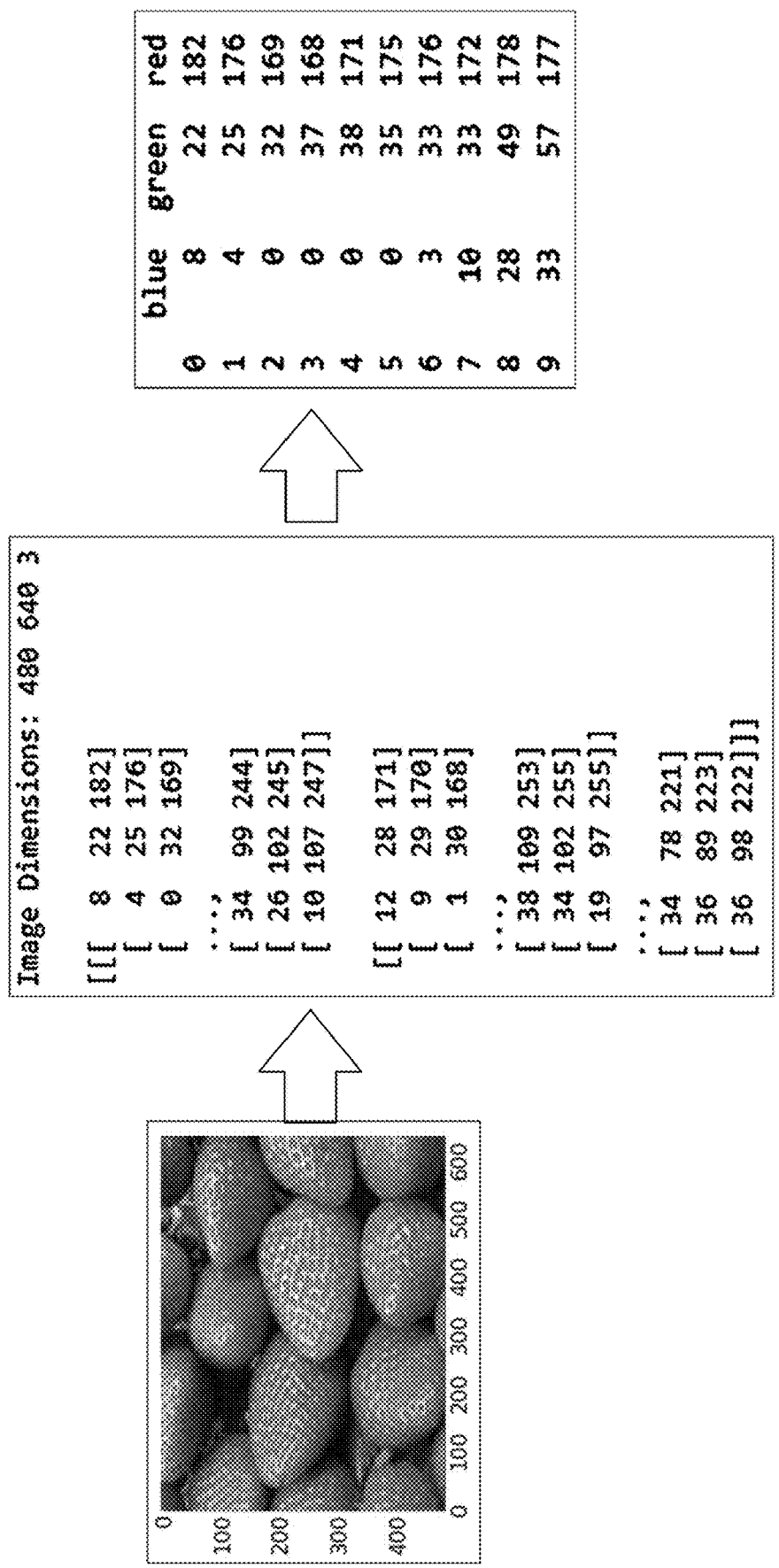
FIG. 15 illustrates some exemplary intermediate results from an image analysis operation.
Figure 16:
FIG. 16 illustrates results of performing an exemplary blur operation on a food quality image.
Figure 17:
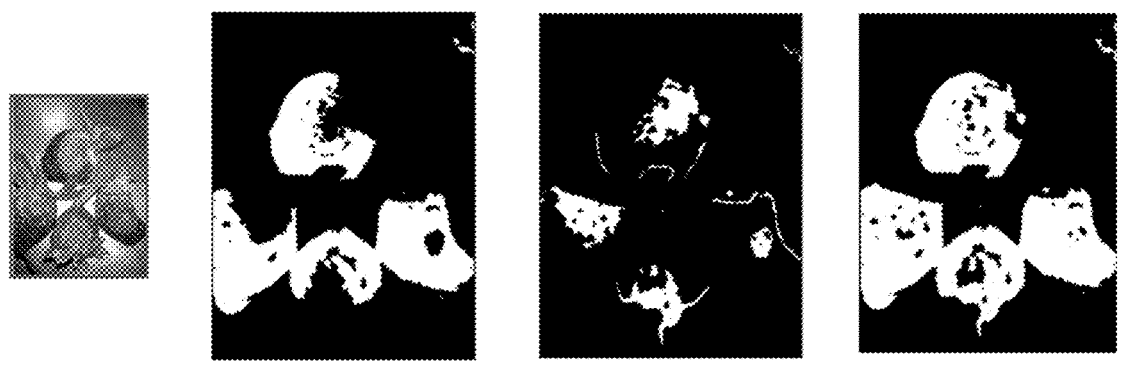
FIG. 17 illustrates exemplary segmentation masks for a food quality image.
Figure 18:
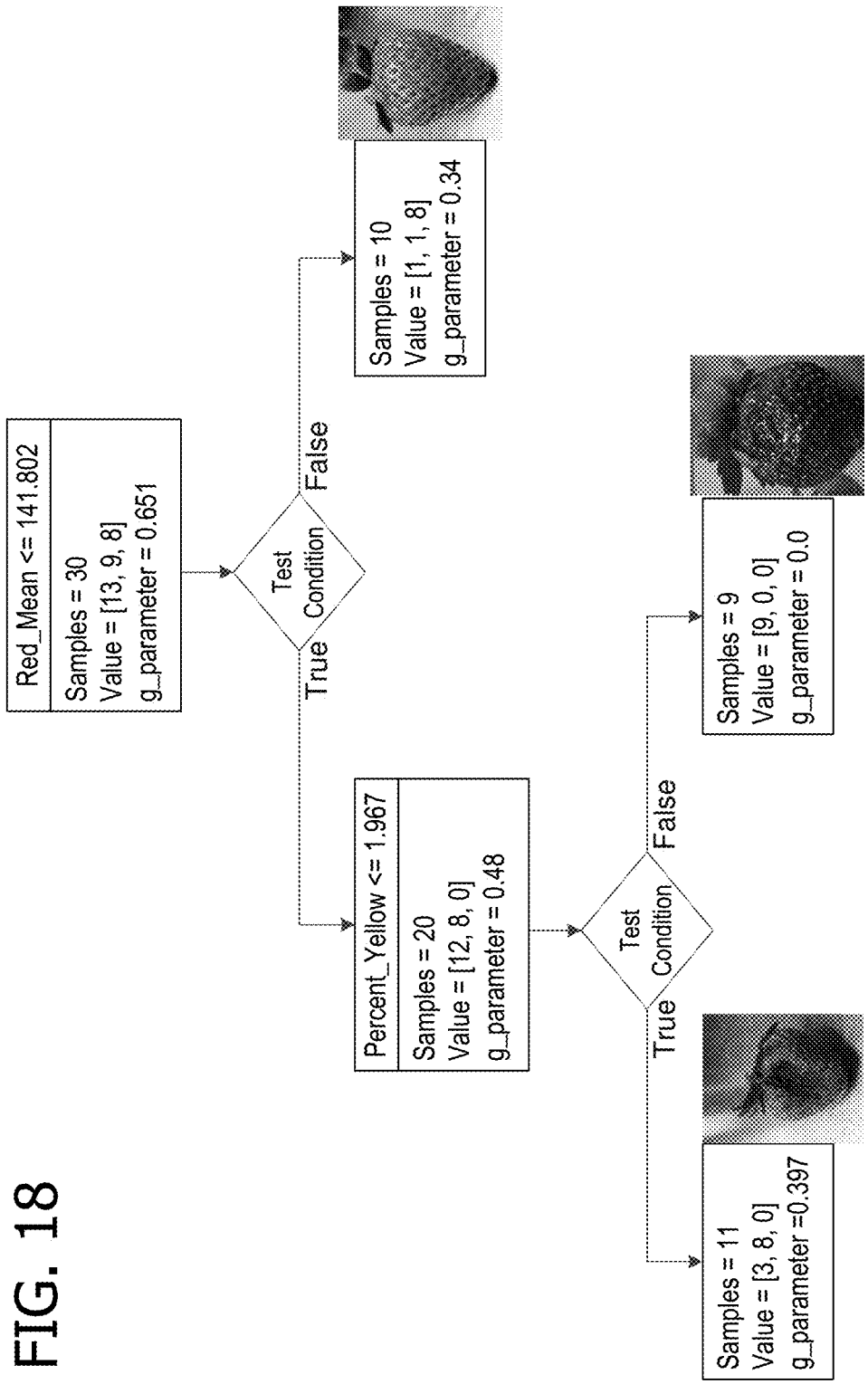
FIG. 18 illustrates exemplary results of a food quality classification operation for the images of FIG. 1.

FIG. 12 is an exemplary diagram illustrating various input and output options that may function with some of embodiments disclosed herein. Computer 1110 (of FIG. 11) may receive input from any of a handheld computing device 1202, that may be a tablet computer (such as a TC 70), a smartphone, or perhaps a notebook computer; smart glasses 1204; 3D goggles 1206, which may be an augmented reality (AR) head mounted display (HMD); a wireless communication device 1208. Which may use cellular, WiFi, or another communication system; a camera 1210, that may operate in the visible spectrum, infrared, or hyperspectral; and drone 1212. Smart glasses 1204 and 3D goggles 1206 may be worn by a produce inspector, and may capture images within the inspector's view, whereas drone 1212 may move over areas of perhaps stationary items. Computer 1110 may also send output to any of the devices 1202-1212. For example, if a produce inspector is wearing smart glasses 1204, a camera on smart glasses 1204 may capture images within the view of the inspector, send the images to computer 1110 for processing as described herein, and return the results for display on smart glasses 1204 so that the inspector is alerted to either pass or discard the item within the inspector's view.

Exemplary Operating Methods and Systems

Embodiments of a system for food quality image classification are disclosed for classifying food items as either damaged or not damaged, and if damaged, the type of damage. Damage classification may be performed in multiple stages, for example, RGB data may be used in a first classification, and HSV data may be used in a second classification, such as whether damage is from bruising or decay. Blurring may improve determination accuracy, and an ongoing feedback and training loop may improve accuracy results over time.

An exemplary system for food quality image classification, implemented on at least one processor, comprises: a conveyor for transporting food item containers; a product code scanner for identifying food item types; an image collector for collecting images of the food items; a network for transmitting food item images and identifications to a data store; and an image classification node in communication with the data store, the image classification node comprising: a processor; and a non-transitory computer-readable medium storing instructions that are operative when executed by the processor to: receive food item images; blur the received images with a Gaussian kernel; extract features from the received images; selecting, according to food item identification, at least one classification model to define damage conditions and decay conditions; determine, using the at least one classification model and extracted features, which images are to be classified as damage and which images are to be classified as no damage; and responsive to classifying images as damage, determine, using the at least one classification model and extracted features, which images are to be classified as damage bruised and which images are to be classified as damage decayed.

An exemplary method for food quality image classification, implemented on at least one processor, comprises: receiving food item images; blurring the received images; selecting at least one classification model to define damage conditions and decay conditions; determining, using the at least one classification model, which images are to be classified as damage and which images are to be classified as no damage; and responsive to classifying images as damage, determining, using the at least one classification model, which images are to be classified as damage bruised and which images are to be classified as damage decayed.

One or more exemplary computer storage devices having a first computer-executable instructions stored thereon for food quality image classification, which, on execution by a computer, causes the computer to perform operations comprising: receiving food item images; blurring the received images; selecting at least one classification model to define damage conditions and decay conditions; determining, using the at least one classification model, which images are to be classified as damage and which images are to be classified as no damage; and responsive to classifying images as damage, determining, using the at least one classification model, which images are to be classified as damage bruised and which images are to be classified as damage decayed.

Alternatively, or in addition to the other examples described herein, examples include any combination of the following:

converting red, green, blue (RGB) data to hue, saturation, value (HSV) data;

determining which images are to be classified as damage and which images are to be classified as no damage uses RGB data, and determining which images are to be classified as damage bruised and which images are to be classified as damage decayed uses HSV data;

masking the received images, wherein determining which images are to be classified as damage and which images are to be classified as no damage uses masked RGB data, and determining which images are to be classified as damage bruised and which images are to be classified as damage decayed uses masked HSV data;

determining which images are to be classified as damage bruised and which images are to be classified as damage decayed uses more highly blurred image data than determining which images are to be classified as damage and which images are to be classified as no damage;

determining which images are to be classified as damage and which images are to be classified as no damage uses a first classification model, and determining which images are to be classified as damage bruised and which images are to be classified as damage decayed uses a second classification model different from the first classification model;

determining the accuracy of the classifications;

responsive to determining the accuracy of the classifications, determining whether additional training is needed;

responsive to determining additional training is needed, training the at least one classification model; and identifying a food item type.

The examples illustrated and described herein as well as examples not specifically described herein but within the scope of aspects of the disclosure constitute an exemplary entity-specific value optimization environment. The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system for food quality image classification, implemented on at least one processor, the system comprising:
   a conveyor for transporting food item containers;
   a product code scanner for identifying food item types;
   an image collector for collecting images of the food items;
   a network for transmitting food item images and identifications to a data store; and
   an image classification node in communication with the data store, the image classification node comprising:
      a processor; and
      a non-transitory computer-readable medium storing instructions that are operative when executed by the processor to:
         receive food item images;
         mask the received food item images;
         blur the masked received images with a Gaussian kernel;
         extract features from the blurred masked received images, including red, green, blue (RGB) data;
         selecting, according to food item identification, at least one classification model to define damage conditions and decay conditions;
         determine, using the at least one classification model and extracted features, which images are to be classified as damage and which images are to be classified as no damage;
         convert the extracted RGB data from the blurred masked received images to hue, saturation, value (HSV) data; and
         responsive to classifying images as damage, determine, using the at least one classification model and the HSV data, which images are to be classified as damage bruised and which images are to be classified as damage decayed.

2. The system of claim 1 wherein determining which images are to be classified as damage bruised and which images are to be classified as damage decayed uses more highly blurred image data than determining which images are to be classified as damage and which images are to be classified as no damage.

3. The system of claim 1 wherein:
   determining which images are to be classified as damage and which images are to be classified as no damage uses a first classification model, and
   determining which images are to be classified as damage bruised and which images are to be classified as damage decayed uses a second classification model different from the first classification model.

4. The system of claim 1 wherein the instructions are further operative to:
   determine the accuracy of the classifications;
   responsive to determining the accuracy of the classifications, determine whether additional training is needed; and
   responsive to determining additional training is needed, train the at least one classification model.

5. A method for food quality image classification, implemented on at least one processor, the method comprising:
   receiving food item images;
   blurring the received images;
   selecting at least one classification model to define damage conditions and decay conditions;
   determining, using the at least one classification model, which images are to be classified as damage and which images are to be classified as no damage; and
   responsive to classifying images as damage, determining, using the at least one classification model, which images are to be classified as damage bruised and which images are to be classified as damage decayed, wherein determining which images are to be classified as damage bruised and which images are to be classified as damage decayed uses more highly blurred image data than determining which images are to be classified as damage and which images are to be classified as no damage.

6. The method of claim 5 further comprising:
   converting red, green, blue (RGB) data to hue, saturation, value (HSV) data.

7. The method of claim 6 wherein
   determining which images are to be classified as damage and which images are to be classified as no damage uses RGB data, and
   determining which images are to be classified as damage bruised and which images are to be classified as damage decayed uses HSV data.

8. The method of claim 6 further comprising:
   masking the received images; and wherein
   determining which images are to be classified as damage and which images are to be classified as no damage uses masked RGB data, and
   determining which images are to be classified as damage bruised and which images are to be classified as damage decayed uses masked HSV data.

9. The method of claim 5 wherein:
   determining which images are to be classified as damage and which images are to be classified as no damage uses a first classification model, and
   determining which images are to be classified as damage bruised and which images are to be classified as damage decayed uses a second classification model different from the first classification model.

10. The method of claim 5 further comprising:
    determining the accuracy of the classifications;
    responsive to determining the accuracy of the classifications, determining whether additional training is needed; and
    responsive to determining additional training is needed, training the at least one classification model.

11. The method of claim 5 further comprising:
    identifying a food item type, and wherein:
    selecting at least one classification model to define damage conditions and decay conditions comprises selecting, according to food item identification, at least one classification model to define damage conditions and decay conditions.

12. One or more computer storage devices having a first computer-executable instructions stored thereon for food quality image classification, which, on execution by a computer, cause the computer to perform operations comprising:
- receiving food item images;
- blurring the received images;
- selecting at least one classification model to define damage conditions and decay conditions;
- determining, using the at least one classification model and red, green, blue (RGB) data, which images are to be classified as damage and which images are to be classified as no damage; and
- responsive to classifying images as damage, converting the RGB data to hue, saturation, value (HSV) data; and
- determining, using the at least one classification model and the HSV data, which images are to be classified as damage bruised and which images are to be classified as damage decayed.

13. The one or more computer storage devices of claim 12 wherein the operations further comprise:
- masking the received images; and wherein
- determining which images are to be classified as damage and which images are to be classified as no damage uses masked RGB data, and
- determining which images are to be classified as damage bruised and which images are to be classified as damage decayed uses masked HSV data.

14. The one or more computer storage devices of claim 12 wherein determining which images are to be classified as damage bruised and which images are to be classified as damage decayed uses more highly blurred image data than determining which images are to be classified as damage and which images are to be classified as no damage.

15. The one or more computer storage devices of claim 12 wherein the operations further comprise:
- determining which images are to be classified as damage and which images are to be classified as no damage uses a first classification model, and
- determining which images are to be classified as damage bruised and which images are to be classified as damage decayed uses a second classification model different from the first classification model.

16. The one or more computer storage devices of claim 12 wherein the operations further comprise:
- determining the accuracy of the classifications;
- responsive to determining the accuracy of the classifications, determining whether additional training is needed; and
- responsive to determining additional training is needed, training the at least one classification model.

* * * * *